US012226833B2

(12) United States Patent
Güther et al.

(10) Patent No.: US 12,226,833 B2
(45) Date of Patent: Feb. 18, 2025

(54) DEVICE FOR ATOMIZING A MELT STREAM BY MEANS OF A GAS

(71) Applicants: ALD Vacuum Technologies GmbH, Hanau (DE); GfE Metalle und Materialien GmbH, Nuremberg (DE)

(72) Inventors: Volker Güther, Altdorf (DE); Karin Ratschbacher, Nuremberg (DE); Melissa Allen, Burgthann (DE); Sergejs Spitans, Frankfurt am Main (DE); Henrik Franz, Freigericht (DE)

(73) Assignees: GFE METALLE UND MATERIALIEN GMBH, Nuremberg (DE); ALD VACUUM TECHNOLOGIES GMBH, Hanau (DE)

( * ) Notice: Subject to any disclaimer, the term of this patent is extended or adjusted under 35 U.S.C. 154(b) by 61 days.

(21) Appl. No.: 17/763,023

(22) PCT Filed: Sep. 17, 2020

(86) PCT No.: PCT/EP2020/075994
§ 371 (c)(1),
(2) Date: Mar. 23, 2022

(87) PCT Pub. No.: WO2021/058374
PCT Pub. Date: Apr. 1, 2021

(65) Prior Publication Data
US 2022/0339701 A1 Oct. 27, 2022

(30) Foreign Application Priority Data
Sep. 24, 2019 (DE) ...................... 10 2019 214 555.8

(51) Int. Cl.
B22F 9/08 (2006.01)
B22F 1/065 (2022.01)

(52) U.S. Cl.
CPC .............. B22F 9/082 (2013.01); B22F 1/065 (2022.01); B22F 2009/0836 (2013.01);
(Continued)

(58) Field of Classification Search
CPC .. B22F 9/082; B22F 1/065; B22F 2009/0836; B22F 2009/088; B22F 2009/0888; B22F 2999/00
See application file for complete search history.

(56) References Cited

U.S. PATENT DOCUMENTS 5,147,448 A     9/1992  Roberts et al.
5,280,884 A  *  1/1994  Dorri ...................... B22F 9/082
                                                        425/7
(Continued)

FOREIGN PATENT DOCUMENTS

CN     102271433 A    12/2011
CN     206065418 U     4/2017
(Continued)

OTHER PUBLICATIONS

Sanjay et al. ("Computational and heat transfer analysis of convergent nozzle used for gas atomization of liquid metals." International Journal of Dynamics of Fluids 6.2 (2010): 161-179.) teaches a nozzle with only convergent sections, which can produce subsonic flows during atomization (p. 162) (Year: 2010).*
(Continued)

Primary Examiner — Ricardo D Morales
(74) Attorney, Agent, or Firm — McGlew and Tuttle, P.C.

(57) ABSTRACT

A device for atomizing a metallic, intermetallic or ceramic melt stream by means of a gas to form a spherical powder, comprising
a melt chamber,
a powder chamber,
an induction coil in the melt chamber,
(Continued)

a melt material, preferably melt rod in the induction coil and an atomizer nozzle interconnecting the melt and powder chambers and being arranged in a nozzle plate, for the melt stream melted off from the melt material by the induction coil, wherein the atomizer nozzle has an exclusively convergent nozzle profile having nozzle flanks which have a circular-arc-shaped cross-section, and therefore both the atomizing gas and the melt stream and the droplets generated therefrom reach a velocity which is at most equal to, preferably below the acoustic velocity of the atomizing gas.

18 Claims, 1 Drawing Sheet

(52) U.S. Cl.
CPC . *B22F 2009/088* (2013.01); *B22F 2009/0888* (2013.01); *B22F 2999/00* (2013.01)

(56) References Cited

U.S. PATENT DOCUMENTS

| | | | |
|---|---|---|---|
| 6,254,661 | B1 | 7/2001 | Takeda et al. |
| 2016/0318105 | A1* | 11/2016 | Gerking ................. B22F 9/082 |

FOREIGN PATENT DOCUMENTS

| | | |
|---|---|---|
| CN | 107262730 A | 10/2017 |
| CN | 108247074 A | 7/2018 |
| DE | 1958610 A1 | 6/1970 |
| DE | 4102101 A1 | 7/1992 |
| DE | 102004001346 A1 | 7/2004 |
| DE | 19881316 B4 | 8/2006 |
| EP | 0357540 A1 | 3/1990 |
| EP | 1689519 B1 | 6/2012 |
| WO | 2011054113 A1 | 5/2011 |
| WO | 2015092008 A1 | 6/2015 |
| WO | 2015135075 A1 | 9/2015 |

OTHER PUBLICATIONS

Schulz G., "Laminar sonic and supersonic gas flow atomization—the NANOVAL process," World Congress on PM & Particulate Materials, Advances in PM, Jan. 1996.

Geller, W. 2003 Thermodynamik für Maschinenbauer, Springer, Second Edition.

A.J. Yule and J.J. Dunkley, Atomization of Melts, Oxford Univ. Press.

Eidler, E. 2013 Taschenbuch der Mathematik, Springer, Third Edition.

* cited by examiner

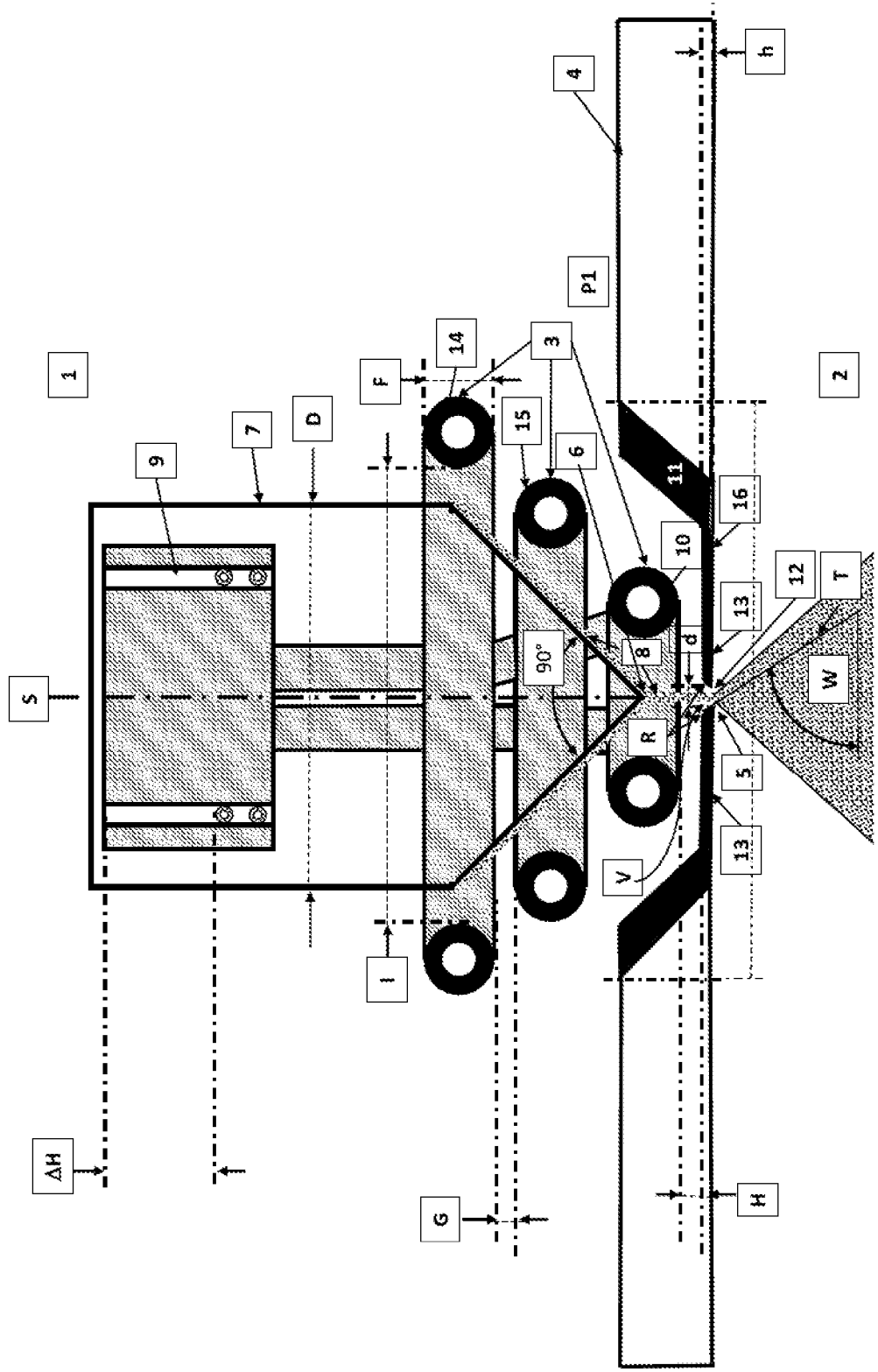

DEVICE FOR ATOMIZING A MELT STREAM BY MEANS OF A GAS

CROSS-REFERENCES TO RELATED APPLICATIONS

This application claims the priority of German Patent Application, Serial No. DE 10 2019 214 555.8, filed Sep. 24, 2019, the content of which is incorporated herein by reference in its entirety as if fully set forth herein.

FIELD OF THE INVENTION

The invention relates to a device for atomizing a metallic, intermetallic or ceramic melt stream by means of a gas to form a spherical powder, comprising a melt chamber, a powder chamber, an induction coil in the melt chamber, a melt material, preferably melt rod in the induction coil and an atomizer nozzle interconnecting the melt and powder chambers and being arranged in a nozzle plate for the melt stream melted off from the melt material by the induction coil.

BACKGROUND OF THE INVENTION

With regard to the background of the invention, it is to be stated that metal powders are used in numerous fields of technology on an industrial scale for the production of components or functional layers. Examples include sintered steels, hard metals, contact materials, permanent magnets, ceramics and thermally sprayed layers.

Particularly in the field of additive manufacturing and metal injection molding, special requirements are placed on the sphericity and particle size distribution of the powders, as these are a necessary prerequisite for further processability. Four basic technologies have become established for the production of spherical metal powders, plasma-assisted atomization of wires—see WO 2011 054113 A1, plasma spheroidization of powders with irregular surfaces—see EP 1 689 519 B1, the Plasma Rotating Electrode process—see U.S. Pat. No. 5,147,448 A, and gas atomization of liquid melts.

The latter is also applicable to certain ceramics and includes a variety of different methods for producing the liquid melts:
- VIGA (Vacuum Induction Gas Atomization—inductive melting in ceramic and cold crucibles)
- EIGA (Electrode Induction Gas Atomization—inductive crucibleless melting of metallic or intermetallic rods)
- PIGA (Plasma Inert Gas Atomization—plasma melting in a cold crucible)

In crucible-based melting methods, the pouring stream to be atomized can be generated by tilting the crucible (pouring), by a bottom outlet of the crucible or by melting a rod (electrode). The preferred melting method is selected according to specific properties of the material to be melted. For example, high-melting-point metals or alloys with an affinity for oxygen cannot be melted in ceramic crucibles because the crucible materials cannot withstand the process temperatures or are reduced by the melt.

All atomization methods of free fall liquid melts by means of an atomizing gas have an influence on the sphericity and the gas porosity of the resulting powder particles, as can be seen from the technical article Schulz G., "Laminar sonic and supersonic gas flow atomization—the NANOVAL process", World Congress on PM & Particulate Materials, Advances in PM, 1996, 1, pp. 43-54. To date, it is not possible to produce gas atomized powders free of satellites on the powder particle surfaces and without generating gas porosity, which is state of the art by means of PREP or plasma atomization. PREP and plasma atomization, however, have serious disadvantages in terms of economy and are therefore significantly more expensive than gas atomized powders.

Among the gas-assisted atomization methods, a basic distinction is made between different designs of free-fall atomization (free-fall nozzle, close-coupled nozzle) and gas-jet-guided atomization using a Laval nozzle.

A device for atomizing a melt stream by means of a gas to form spherical powder comprising a melt chamber, a powder chamber, an induction coil in the melt chamber, a melt material, preferably melt rod in the induction coil and an atomizer nozzle interconnecting the melt and powder chambers and being arranged in a nozzle plate for the melt stream melted off from the melt material by the induction coil with such a Laval nozzle is known from WO 2015/092008 A1 and comprises a melt chamber, a powder chamber, an induction coil in the melt chamber, and a Laval atomizer nozzle with convergent-divergent nozzle profile arranged in a nozzle plate and interconnecting these two chambers.

Through the atomizer nozzle, the melt stream, radially enveloped by a pressurized atomizing gas and inductively generated from the melt material in the melt chamber by the induction coil, is introduced into the nozzle due to the effect of gravity, and split into fine droplets in and after the atomizer nozzle. These solidify into the powder particles to be produced.

In this context, it has been shown that the powder particles produced with this method require improvement with regard to satellite formation and the development of gas porosity.

SUMMARY OF THE INVENTION

It is an object of the present invention to provide an atomizing device for gas atomization of liquid metal- and ceramic melts that largely avoids satellite formation and the development of gas porosity while providing maximum economic efficiency.

This object is achieved by the use of a novel gas jet-guided atomizer nozzle having an exclusively convergent nozzle profile having nozzle flanks which have circular-arc-shaped cross-section, and therefore the atomizing gas and the melt stream and the droplets produced therefrom reach a velocity which is at most equal to, preferably below the acoustic velocity of the atomizing gas. The gas velocity of the atomizing gas thus does not exceed the speed of sound during the atomization process, in contrast to the known Laval atomization.

It has been found that with such a nozzle profile, qualitatively improved powder particles can be produced with maximum economic efficiency, while avoiding satellite formation and gas porosity as far as possible.

Preferred further embodiments of the invention are given hereinafter. For example, the surface of the nozzle plate on the nozzle outlet side can be flat and oriented perpendicularly to the flow direction of the melt stream. A pronounced edge is thus formed on the nozzle outlet side, from which an additional swirling effect is produced which supports the formation of particles from the melt stream.

According to a further preferred embodiment, the induction coil can be designed to be height-adjustable.

In an advantageous manner, this height adjustability of the coil allows the free fall height of the pouring stream forming the melt stream to be varied up to the nozzle. Since the melt temperature decreases with increasing drop height, in particular due to the emission of radiation power, the viscosity of the melt can be changed upon entry into the nozzle and thus the resulting particle size distribution can be controlled in a targeted manner.

It should be noted that the coil height adjustability can be used separately from the rest of the present invention in atomizing devices having other types of atomizer nozzles while achieving the advantages described.

According to a further preferred embodiment, the induction coil may be of conically narrowing design in the direction of the atomizer nozzle, with a cylindrical rod of the material to be atomized being arranged coaxially in the induction coil for generating the melt stream.

Further preferred embodiments relate to parameters for the design and dimensioning of the nozzle profile, with which particularly good results are obtained for the powder particles produced, in terms of quality. To avoid repetition, reference is made to the embodiment example.

In order to be able to adapt the atomizing device according to the invention as rationally and quickly as possible to different purposes of use, in a further preferred embodiment the atomizer nozzle can be arranged in a separate nozzle insert which is detachably seated in the nozzle plate.

Further features, details and advantages of the invention will be apparent from the following description of an exemplary embodiment with reference to the accompanying drawing.

BRIEF DESCRIPTION OF THE DRAWING

FIG. 1 shows a schematic axial section of an atomizing device.

DESCRIPTION OF THE PREFERRED EMBODIMENT

The main components of the atomizing device shown in the drawing are a melt chamber 1, a powder chamber 2 (also called an atomizing chamber), an induction coil 3 arranged in the melt chamber 1, and a nozzle plate 4 arranged between the two chambers 1, 2, in which an atomizer nozzle 5 serves to interconnect these two chambers 1, 2. The nozzle plate 4 is flat on the outlet side 16 and oriented perpendicularly to the flow direction of a melt stream 8.

In the melt chamber 1, which is under an argon pressure p1, the material to be atomized is partially introduced into the conical induction coil 3 with three windings in the form of a cylindrical rod 7 provided with a 45° tip 6, as is basically known, for example, from DE 41 02 101 A1. The conicity of the induction coil 3 corresponds to the conicity of the tip 6 of the rod 7 to be atomized. The tip 6 and in particular the surface of the tip 6 is inductively heated by medium-frequency current flowing through the induction coil 3 until a molten phase is formed at the surface. This melt stream 8 runs down the conical surface and drips off the tip 6 in the form of a continuous pouring stream. The mass flow of the pouring stream forming the melt stream 8 can be varied over a wide range between 0.4 kg/min and 2.5 kg/min via the electrical power inductively coupled in. A melt stream between 0.8 and 1.5 kg/min is considered particularly suitable for atomization. During atomization, the rod 7 rotates slowly about its axis of symmetry S and moves continuously downward. The diameter D of rod 7, which can be between 30 and 200 mm, and the set lowering speed determine the respective melt rate. Rod diameters D between 80 and 150 mm have proved to be particularly favorable from a process engineering point of view.

A linear suspension 9, shown only schematically in the drawing, provides the height adjustability H of the induction coil 3, by means of which the free fall height of the pouring stream up to the nozzle and thus, as mentioned above, the viscosity of the melt as it enters the nozzle can be varied. Distances between the atomizer nozzle 5 and the induction coil 3 of 3 to 100 mm have proven to be technically useful. At smaller coil distances, there is a risk of voltage flashover from the coil to the nozzle; at larger distances, there is a risk of splitting of the pouring stream before it enters the nozzle opening. Horizontal coil windings have also proven to be particularly advantageous, since they prevent the casting flow from being deflected by electromagnetic forces when it leaves the coil magnetic field, in contrast to rising coil windings.

The rotationally symmetrical atomizer nozzle 5 is located with its center in the axis of symmetry S of rod 7 and coil 3 having the distance H below the lowermost winding in the induction coil 3. It is arranged in a separate nozzle insert 11, which is detachably seated in the nozzle plate 4, and is indirectly cooled by pressing with the pressure p1 onto the water-cooled nozzle plate 4. The melt stream 8 is radially enveloped by the gas flowing from the melt chamber 1 into the powder chamber 2, constricted and accelerated through the circular opening of the atomizer nozzle 5 to at most the speed of sound at the nozzle outlet. The driving force for this is the positive pressure difference between the gas pressure in the melt chamber p1 and the gas pressure p2 in the powder chamber 2. This pressure difference is at least 0.2 bar, at the highest 25 bar. Technically particularly advantageous pressure differences are in the range between 2 bar and 10 bar.

Even at high pressure differences p1–p2, the atomizing gas V in the atomizer nozzle 5 is accelerated at most to the speed of sound due to the exclusively convergent nozzle shape, since in the supersonic range a convergent nozzle profile acts as a diffuser and slows the gas down again. The higher the pressure difference p1–p2, the sooner the acoustic velocity limit is reached in the nozzle profile. As a consequence, the gas flow is not laminar, since the gas pressure immediately at the nozzle outlet is a function of the pressure difference and significantly higher than the ambient pressure p2 in the powder chamber.

The atomizing gas causes pressure and shear stresses in the jet-shaped melt stream 8, constricting and accelerating the latter. The melt velocity in the melt jet decreases radially from the outside to the inside. After leaving the atomizer nozzle 5, the compressive and shear stresses are instantly relieved by the rupture of the melt jet filament 12 into individual droplets which solidify in the atomizing chamber to form spherical powder particles. Surprisingly, this does not require a laminar gas flow or gas velocities greater than the speed of sound. On the contrary, atomization exclusively in the sub-sonic range improves the sphericity of the powder particles and reduces the gas porosity compared to the known LAVAL atomization. This is achieved by an exclusively convergent nozzle profile, in which the nozzle flanks 13 are circular arc-shaped in cross-section in the form of a pitch circle having a radius R of 2 to 15 mm, preferably of 5 mm, and a height h of the atomizer nozzle 5, which is smaller than the convergence circle radius R. A tangent T at the nozzle outlet has an angle W of <90° with respect to the nozzle outlet side. In the specific embodiment example, the height h is 4.5 mm with a radius of convergence R of 5 mm. The diameter of the nozzle d can vary from 2 to 20 mm. In the embodiment example, the nozzle diameter d is 10 mm With these parameters, a $d_{50}$-value of 50 μm is achieved in a Ti alloy powder at a pressure of p1=4.5 bar and p2=930 mbar.

Furthermore, the nozzle insert 11 is made of a material specific to the species to be atomized, for example TiAl or titanium. Its diameter E can be between 20 and 200 mm, preferably 140 mm.

The rod 7, for example, can be a so-called EIGA electrode having a diameter D of up to 150 mm. In the embodiment example shown, a diameter D of 115 mm has been selected.

For the induction coil 3 in the form of an internally cooled, conical coil made of copper with a pitch of 45°, the internal diameter I of the uppermost winding 14 can be up to 170 mm, specifically for example 130 mm, and the vertical distance G of the uppermost, middle and lowermost coil windings 14, 15, 10 can have a dimension of 3 to 20 mm, preferably 8 mm. The diameter F of the coil tube may be 10 to 30 mm, preferably 16 mm A rectangular cross-section is also possible.

The distance H between the underside of the induction coil 3 and the nozzle 5 is 10 mm.

The invention claimed is:

1. A device for atomizing one of a group comprising a metallic, intermetallic and ceramic melt stream by means of an atomizing gas to form a spherical powder, the device comprising:
   a melt chamber;
   a powder chamber;
   an induction coil in the melt chamber;
   a melt material in the induction coil; and
   an atomizer nozzle interconnecting the melt chamber and the powder chamber and being arranged in a nozzle plate for the melt stream melted off from the melt material by the induction coil, wherein
   the atomizer nozzle consists of an exclusively convergent nozzle profile having nozzle flanks which have a circular-arc-shaped cross-section, and therefore both the atomizing gas and the melt stream, both of which are conducted through the exclusively convergent nozzle profile, and droplets generated therefrom reach a velocity which is at most equal to the acoustic velocity of the atomizing gas,
   wherein a tangent at the nozzle outlet has an angle of <90° with respect to the nozzle outlet side.

2. The device according to claim 1, wherein the surface of the nozzle plate on its nozzle outlet side is flat and oriented perpendicularly to the flow direction of the melt stream.

3. The device according to claim 1, wherein the induction coil is adjustable in height.

4. The device according to claim 1, wherein the induction coil is of conically narrowing configuration in a direction of the atomizer nozzle, wherein a cylindrical rod of the material to be atomized is arranged coaxially in the induction coil for generating the melt stream.

5. The device according to claim 1, wherein the nozzle profile is rotationally symmetrical and the atomizer nozzle has a diameter at a point of smallest cross-section of 3 to 15 mm.

6. The device according to claim 1, wherein the cross-sectional profile of the nozzle flanks is formed by a pitch circle arc having a radius of 2 to 10 mm.

7. The device according to claim 1, wherein the height of the atomizer nozzle is between 2.5 and 9.5 mm.

8. The device according to claim 1, wherein the atomizer nozzle is arranged in a separate nozzle insert detachably seated in the nozzle plate.

9. The device according to claim 1, wherein the melt material is a melt rod.

10. The device according to claim 1, wherein both the atomizing gas and the melt stream and the droplets generated therefrom reach a velocity which is below the acoustic velocity of the atomizing gas.

11. The device according to claim 7, wherein the nozzle profile is rotationally symmetrical and the atomizer nozzle has a diameter at a point of smallest cross-section of 6 to 12 mm.

12. The device according to claim 1, wherein the nozzle profile is rotationally symmetrical and the atomizer nozzle has a diameter at a point of smallest cross-section of 10 mm.

13. The device according to claim 1, wherein the cross-sectional profile of the nozzle flanks is formed by a pitch circle arc having a radius of 5 mm.

14. The device according to claim 1, wherein the height of the atomizer nozzle is 4.5 mm.

15. The device according to claim 1, wherein:
   the nozzle profile extends over the entire atomizer nozzle.

16. The device according to claim 1, wherein:
   the velocity of the atomizing gas, the melt stream and the droplets generated, is the highest velocity achieved in the atomizer nozzle.

17. The device according to claim 1, wherein the melt stream is radially enveloped by the atomizing gas flowing from the melt chamber into the powder chamber through the atomizer nozzle.

18. The device according to claim 1, wherein:
   the atomizer nozzle is arranged to cause the melt stream to be radially enveloped by the atomizing gas flowing from the melt chamber into the powder chamber.

* * * * *